United States Patent Office 3,192,196
Patented June 29, 1965

3,192,196
OXIDATION OF ALIPHATIC HYDRAZO COMPOUNDS TO THE CORRESPONDING ALIPHATIC AZO COMPOUNDS
Frederick D. Vidal, East Orange, and Vincent G. Sarli, Pompton Plains, N.J., assignors to Wallace & Tiernan Inc., Belleville, N.J., a corporation of Delaware
No Drawing. Filed Nov. 27, 1962, Ser. No. 240,418
14 Claims. (Cl. 260—192)

This invention relates to the manufacture of azo compounds. More particularly, this invention relates to the manufacture of azo compounds from hydrazo compounds. In accordance with one embodiment this invention is directed to the conversion of hydrazo compounds to the corresponding azo compounds.

The manufacture of azo compounds, organic compounds containing or characterized by the grouping (1)                C—N=N—C from hydrazo compounds, organic compounds containing or characterized by the grouping (2)

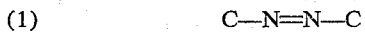

has already been proposed. Various techniques for the manufacture of azo compounds from hydrazo compounds which have been proposed include oxidation of the hydrazo compound to the corresponding azo compound employing a sulfuric acid solution of potassium dichromate or potassium permanganate. These reagents, however, are relatively expensive and difficult to handle and, accordingly, a hydrazo to azo conversion process based on these reagents is relatively expensive. Another technique proposed for the conversion of hydrazo compounds to corresponding azo compounds employs acetic acid and ammonium nitrate, as disclosed in United States Patent 3,017,406. It has also been proposed to react biurea with atmospheric oxygen to produce azodicarbonamide and hydrogen peroxide, as disclosed in German Patent 1,031,289. However, attempts to carry out the reaction disclosed in this patent have not been successful. Other procedures involving oxidation for the conversion of hydrazo compounds to corresponding azo compounds are known.

For the most part the known processes are difficult to practice, are relatively expensive to operate, involve the use of expensive or difficult to handle reagents and are otherwise not completely satisfactory.

Accordingly, it is an object of this invention to provide an improved process useful for converting a hydrazo compound to an azo compound.

Another object of this invention is to provide an improved oxidation process for the manufacture of azo compounds from hydrazo compounds.

Still another object of this invention is to provide an improved oxidation process employing relatively cheap and readily available reagents for the conversion of aliphatic hydrazo compounds to their corresponding aliphatic azo compounds.

How these and other objects of this invention are achieved will become apparent in the light of the accompanying disclosure.

It has now been discovered that hydrazo compounds, organic compounds containing the grouping

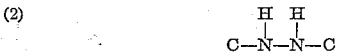

are converted to azo compounds, organic compounds containing the grouping

C—N=N—C by reacting the hydrazo compound with a reagent mixture containing elemental oxygen and nitrogen doxide. Upon reaction of the hydrazo compounds with the reagent mixture containing elemental oxygen and nitrogen dioxide, the hydrazo compound is converted to the corresponding azo compound.

By way of explanation of the probable reaction mechanism involved in the practice of this invention, it appears that oxygen is the oxidizing agent since it is the substance consumed in the greatest quantity. Molecular oxygen is reduced in this process and appears in the final stage as water. It is assumed that the role of nitrogen dioxide relates to its reversible reduction to nitric oxide and subsequent reoxidation. Nitrogen dioxide acts merely as a mediator; it is not consumed in this process and could presumably be recovered quantitatively. Its role as an oxygen carrier, when in the reduced form of nitric oxide, would be somewhat similar to the role of ascorbic acid in certain biochemical processes. Nitric oxide acts as an oxygen acceptor and the nitrogen dioxide thus is regenerated in the presence of oxygen.

Usually the quantity of nitrogen dioxide required to effect conversion of the hydrazo compound to the corresponding azo compound is substantially less than stoichiometric. The elemental oxygen, which constitutes together with the nitrogen dioxide the reagent mixture, is consumed and appears as water. Accordingly, it is necessary if the oxidation reaction is to be carried out to completion to maintain or to add or to make available oxygen to the reagent mixture while the hydrazo to azo conversion operation is being carried out.

In effecting the conversion of the hydrazo compound to the corresponding azo compound the reagent mixture comprising free elemental oxygen and nitrogen dioxide may be added as a mixture containing both elemental oxygen and nitrogen dioxide or the components of the reagent mixture may be separately added, i.e. first a stream containing elemental oxygen, then a stream containing nitrogen dioxide may be added to the reaction admixture or vice versa.

The term "nitrogen dioxide" as used herein is meant not only to include nitrogen dioxide, a compound having the formula $NO_2$, but also its equilibrium mixture with nitrogen tetroxide, the equilibrium admixture containing the compounds having the chemical formulas $NO_2$ and $N_2O_4$. At room temperature most of the nitrogen dioxide is actually in the form of nitrogen tetroxide.

The nitrogen dioxide employed in the practices of this invention may be from any suitable source, such as the liquid product sold commercially in cylinders or the product formed by chemical generators or the product formed when air is passed through an electric arc.

The conversion of hydrazo compound to azo compounds in accordance with the practices of this invention may be carried out at any suitable temperature, preferably a temperature in the range from about 20° C. to about 100° C., more or less, usually depending upon the particular hydrazo compound undergoing conversion. Higher or lower temperatures, as low as 0° C. and as high as 150° C. may also advantageously be employed.

The conversion reaction is conveniently carried out at ambient or substantially atmospheric pressure. If desired, a superatmospheric pressure, such as a pressure as high as 25 to 100 pounds per square inch greater than atmospheric pressure may be employed. Also, if desired, a subatmospheric pressure, for example, a pressure as low as 5–10 pounds per square inch below atmospheric pressure may be employed.

The oxygen component of the reagent mixture comprising elemental oxygen and nitrogen dioxide may be derived from any suitable source, such as substantially pure oxygen, oxygen-enriched air, air or other material or agent capable of generating or producing elemental oxygen, such as hydrogen peroxide. Like the nitrogen dioxide component, the oxygen component of the reaction mixture may be supplied to the reaction admixture from a separate source or may be created or generated in situ within the reaction admixture wherein the hydrazo compound is undergoing conversion to the corresponding azo compound.

It is convenient to introduce into the reaction mixture atmospheric oxygen in substantial excess of the amounts necessary to effect the oxidation process. If oxygen-enriched air or pure oxygen is used the exhaust gases may be recirculated. The amount of nitrogen dioxide present for reasons of economy ordinarily is substantially less than the molar equivalent of the hydrazo compound to be oxidized.

Advantageously the conversion process is carried out in the presence of a solvent, such as a solvent or carrier for the hydrazo compound undergoing treatment. The solvent or carrier serves as a vehicle or medium for bringing the hydrazo compound undergoing conversion into effective contact with the reagent mixture comprising elemental oxygen and nitrogen dioxide. Suitable solvents include the aliphatic organic acids in liquid state, such as glacial acetic acid, propionic acid, aqueous acetic acid, water, the aqueous mineral acids, such as phosphoric acid, hydrochloric acid, nitric acid, sulfuric acid, and various other organic solvents, particularly polar organic solvents, for example chloroform, the various ketones, such as acetone and methyl ethyl ketone, and the alcohols, such as isopropyl alcohol, and non-polar solvent such as the paraffinic hydrocarbons. In general, any solvent or liquid medium which is resistant to oxidative attack by the reagent mixture comprising elemental oxygen and nitrogen dioxide may be employed, and desirably the solvent should possess at least some limited solubilizing property for the hydrazo compound undergoing conversion. Formic acid is less desirable as a solvent, at least when unmixed with other solvents, because of its tendency to react with the nitrogen dioxide.

If desired, the conversion reaction may be carried out in the absence of a solvent or solubilizing medium. When the conversion reaction is so carried out desirably the hydrazo compound undergoing conversion is in a finely-divided particle form so as to present a relatively large surface area per unit of weight to promote and facilitate oxidation by the reagent mixture of oxygen and nitrogen dioxide.

Generally, the practice of this invention is broadly applicable to the conversion of organic hydrazo compounds to organic azo compounds and is particularly applicable to the conversion of aliphatic hydrazo compounds to the corresponding aliphatic azo compounds.

Hydrazo compounds which are converted to corresponding azo compounds by reaction with elemental oxygen and nitrogen dioxide in accordance with this invention include the hydrazo compounds having the formula (3)

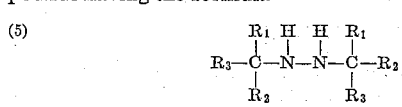

wherein X is selected from the group consisting of NH or O and wherein $R_1$, $R_2$, $R_3$ and $R_4$ are hydrogen or alkyl radicals, such as an alkyl radical containing up to about 18 carbon atoms. Specific hydrazo compounds within the above-identified grouping include Hydrazodicarbonamide,
Hydrazodicarbonamidine,
Dimethylhydrazodicarbonamide, and
Tetraethylhydrazodicarbonamide.

Another class of hydrazo compounds which are converted in accordance with the practice of this invention to the corresponding azo compounds include hydrazo compounds having the formula (4)

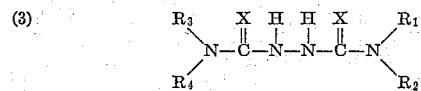

wherein $R_1$, $R_2$ are selected from the group consisting of hydrogen and alkyl radicals, such as an alkyl radical containing up to 18 carbon atoms. Specific examples of hydrazo compounds within this grouping include Bicarbamic acid dimethylester,
Bicarbamic acid diethylester,
Bicarbamic acid dipropylester,
Bicarbamic acid dihexylester, and
Bicarbamic acid dicetylester.

Other hydrazo compounds which are converted to the corresponding azo compounds in accordance with the practices of this invention include those hydrazo compounds having the formula (5)

$$R_3-\underset{\underset{R_2}{|}}{\overset{\overset{R_1}{|}}{C}}-\underset{}{\overset{H}{\underset{|}{N}}}-\underset{}{\overset{H}{\underset{|}{N}}}-\underset{\underset{R_3}{|}}{\overset{\overset{R_1}{|}}{C}}-R_2$$

wherein $R_1$ and $R_2$ and $R_3$ are selected from the group consisting of hydrogen and alkyl radicals, such as an alkyl radical containing up to 18 carbon atoms or wherein $R_1$ and $R_2$ is an alkyl group as defined hereinabove and $R_3$ is the group —CN. Specific examples of hydrazo compounds in accordance with the above-identified class of hydrazo compounds include 1,2-diethylhydrazine,
2,2'-hydrazobis[2-methyl-butyronitrile],
1,2-dimethylhydrazine, and
2,2'-hydrazobis[2-methyl-propionitrile].

Accordingly, hydrazo compounds which are converted to corresponding azo compounds in accordance with the practices of this invention include the hydrazo compounds having the formula (6)

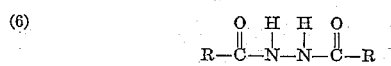

wherein both constituents R are identical and wherein R is selected from the class consisting of O—R' and R''—N—R''', R' being selected from the class consisting of alkyl groups containing from 1 to 18 carbon atoms and cycloalkyl groups containing from 4 to 7 carbon atoms and each of R'' and R''' being selected from the class consisting of hydrogen, alkyl groups containing from 1 to 18 carbon atoms, cycloalkyl groups containing from 4 to 7 carbon atoms, unsubstituted aryl groups and aralkyl groups containing a total of 7 to 18 carbon atoms.

As has been indicated, the process is applicable to a relatively large variety of aliphatic hydrazo compounds, as within the class defined by the above recital of the characteristics of R in Formula 6. In addition to the substances named in the accompanying examples other examples of hydrazo compounds, which can be treated in accordance with the invention to produce corresponding azo compounds are: (a) hydrazo bisformamides where one of R'' and R''' is hydrogen and the other is selected as stated above, e.g. 1,6-di-n-dodecyl hydrazo bisformamide, 1,6-dicyclohexyl hydrazo bisformamide, 1,6-dinaphthyl hydrazo bisformamide, 1,6-ditolyl hydrazo bisformamide (being either di-o-, di-m-, or di-p-tolyl); (b) compounds where R'' and R''' are the same, e.g. 1,1,6,6-tetramethyl hydrazo bisformamide, 1,1,6,6-tetra cyclohexyl hydrazo bisformamide, 1,1,6,6-tetraphenyl hydrazo bisformamide; (c) compounds where R'' and R''' are different groups, other than hydrogen, e.g. 1,6-dimethyl, 1,6-diphenyl hydrazo bisformamide, 1,6-dimethyl, 1,6-dibenzyl hydrazo bisformamide; and (d) compounds of the type of Formula 4 above, being esters of hydrazo diformic acid, e.g. di-n-amyl ester, dimethyl ester, di-n-decyl ester, dicyclohexyl ester, dicyclopentyl ester.

It will be understood that the process is applicable to mixture of hydrazo compounds, as well as to single substances, and to hydrazo compounds of various degrees of purity.

Azo compounds also of interest in the practice of this invention include compounds having the formula:

(7)
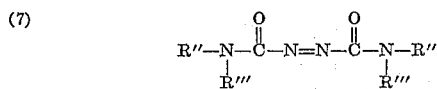

wherein one of R" and R'" is an alkyl group and the other of R" and R'" is selected from the class consisting of hydrogen and alkyl groups; the first of R" and R'" being an alkyl group containing from 10 to 18 carbon atoms when the second of R" and R'" is hydrogen, and the total of carbon atoms in all of the groups R" and R'" together being then from 20 to 36; and R" and R'" being identical with each other and being each an alkyl group containing from 5 to 10 carbon atoms when both of R" and R'" are alkyl groups, and the total of carbon atoms in all of the groups R" and R'" together being then from 20 to 40. Stated in another way, the azo compounds of Formula 7 with both constituents R" identical and both constituents R'" identical and with R" and R'" selected as stated above, specifically in such manner than when one of said constituents is hydrogen the total number of carbon atoms in the compounds is from 22 to 38 inclusive, and when both constituents are alkyl they are the same and the total number of carbon atoms in the compound is from 22 to 42 inclusive. Particularly valuable members of the series are those compounds where one of R" and R'" is hydrogen, e.g. 1,6-di-n-decyl azobisformamide. Other compounds of interest are 1,6-di-n-dodecyl azobisformamide and 1,6-di-n-octadecyl azobisformamide.

In accordance with an embodiment of the practice of this invention the hydrazo compound undergoing conversion to the corresponding azo compound is dissolved or suspended in a suitable solvent, such as glacial acetic acid. A gaseous admixture containing air and nitrogen dioxide is bubbled through the resulting mixture which may or may not be heated, depending upon the particular hydrazo compound undergoing conversion. By measuring the amount of air and nitrogen dioxide passed into the mixture it is possible to predict when the conversion reaction is completed. If desired, a portion of the reaction admixture may be withdrawn and filtered to determine the completeness of the reaction by suitable chemical means, e.g. iodometric titration. After removal of the reaction products the remaining material may be returned to the reaction mixture or employed for additional conversion operations.

The following are specific examples of the practices of this invention:

EXAMPLE NO. 1

*Conversion of hydrazodicarbonamide to azodicarbonamide*

2750 ml. (.11 mol) of nitrogen dioxide were passed into the absorbed by 1650 ml. of glacial acetic acid at room temperature. 400 ml. of this solution were transferred to a 3 liter round bottom flask fitted with condenser and mechanical stirrer. The solution was heated and stirred and when the temperature reached 85 C., air was bubbled through the solution and the addition of a slurry of 40 grams (.34 mol) of hydrazodicarbonamide in 250 ml. of glacial acetic acid was begun. The slurry was added to the nitrogen dioxide-acetic acid solution over a period of 20 minutes. Simultaneously the remaining 1250 ml. of the nitrogen dioxide-acetic acid solution was added over a period of 16 minutes. During the above period the heat of reaction maintained the temperature above 85 C. Afterwards, the reaction admixture was heated with stirring for 10 minutes to 90–95° C. while continuing to bubble air therethrough. The reaction admixture was then cooled, filtered and the yellow product washed first with water and then with methanol. The product was air dried. The yield of azodicarbonamide was 37 grams, 94.1% of theory and ultraviolet spectrophotometric analysis showed the assay to be 95.4%.

EXAMPLE NO. 2

Same as Example No. 1, except that oxygen was used instead of air and .08 mol of nitrogen dioxide and .34 mol of biurea (hydrazodicarbonamide) were employed. The yield of azodicarbonamide was 97.8% of theory and the assay by ultraviolet spectrophotometric analysis was 97.1%.

EXAMPLE NO. 3

Same as Example No. 1, except that the acetic acid solvent had been used in 12 previous runs and was recycled without treatment. The yield of azodicarbonamide was 90% of theory. The assay by ultraviolet spectrophotometric analysis was 99.3%.

EXAMPLE NO. 4

Same as Example No. 1, except that the acetic acid solvent had been used in 16 previous runs and was recycled without treatment. The yield of azodicarbonamide was 81% theory with 100% assay by ultraviolet spectrophotometric analysis.

EXAMPLE NO. 5

In Examples Nos. 1–4, the biurea was added as a slurry to acetic acid containing nitrogen dioxide while simultaneously adding air or oxygen. More conveniently the biurea may be suspended in the acetic acid from the start and an air-nitrogen dioxide or oxygen-nitrogen dioxide gas mixture bubbled through the solution until reaction is complete. Accordingly, 150 grams biurea were suspended in 1500 ml. glacial acetic acid. The mixture was heated with stirring to 80° C. at which time an air-nitrogen dioxide gas mixture was passed into the solution at a rate comprising 235 ml./minute air and 0.5 gm./minute nitrogen dioxide. The exit gas was passed through a condenser packed with glass helices. Glacial acetic acid was dropped through the packing to remove and return to the reactor evolved nitrogen oxide gases. After two hours at 80° C., the air-nitrogen dioxide flow was stopped and the solution cooled and filtered. An 84.3% of theory yield of azodicarbonamide of 96.4% assay by iodometric titration was obtained.

EXAMPLE NO. 6

*Conversion of diethylhydrazodicarboxylate to azodiformic acid diethyl ester*

750 ml. (.03 mol) of nitrogen dioxide gas were absorbed in 700 ml. of glacial acetic acid at room temperature. The solution was then heated to 40° C. and passage of air through the solution was begun. A solution of 20 grams (0.11 mol) of diethylhydrazodicarboxylate in 60 ml. of glacial acetic acid was then added to the nitrogen dioxide acetic acid solution over a period of 20 minutes. The solution was held at 40° C. for 75 minutes after the addition, then at 60° C. for 60 minutes and finally at 80° C. for 30 minutes. Air was passed through the solution during this entire period. The mixture was then cooled to room temperature and the solvent removed under vacuum. The residue was fractionally distilled in vacuo and the fraction distilling at 78–83° C. at 3 mm. Hg abs. was collected. The yield was 15 grams, 76% of theory, and assayed by iodometric analysis as 97% azodiformic acid diethyl ester.

EXAMPLE NO. 7

*Conversion of α,α'-hydrazodi-iso-butyronitrile to α,α'-azodi-iso-butyronitrile*

750 ml. (.03 mol) of nitrogen dioxide gas were absorbed in 700 ml. of glacial acetic acid at room temperature. The solution was heated to 43° C. and air bubbled into the solution. 20 grams (.145 mol) of α,α'-hydrazodi-iso-butyronitrile in 80 ml. of glacial acetic acid were added over a period of 15 minutes. The temperature of the reaction admixture rose to 47° C. during the addition. Following the addition, the reaction admixture was heated 30 minutes at 45° C. and then 1 hour at 50° C. After cooling to room temperature, the solvent was removed in vacuo. The residue was taken up in water and the white crystalline product which separated, was filtered off.

Product yield was 16.7 grams, 84.5% of theory. The product had a melting point of 100.5–103.5° C. and after recrystallization from ethanol the melting point was 101–104° C.

EXAMPLE NO. 8

*Conversion of hydrazodicarbonamidine sulfate to 1,1'-azodicarbonamidine sulfate dihydrate*

2500 ml. (.10 mol) of nitrogen dioxide gas were absorbed in 2100 ml. of glacial acetic acid at room temperature. This solution was heated to 35–40° C. and passage of air into the solution begun. A slurry of 50 grams (.23 mol) of hydrazodicarbonamidine sulfate in 400 ml. of glacial acetic acid was added over a period of 20 minutes. The reaction mixture was then heated to 55–60° C. for 2 hours and to 65–70° C. for ½ hour while continuing to pass air through the solution. After cooling, a bright yellow solid was filtered off, washed with acetic acid and then with methanol. After air drying, the product yield was 31.5 grams, 63.6% of theory. The assay by iodometric titration gave a value of 100% calculated for 1,1'-azodicarbonamidine sulfate dihydrate.

EXAMPLE NO. 9

*Conversion of α,α'-hydrazobis(N-isopropyl)formamide to α,α'-azobis(N-isopropyl)formamide*

380 ml. (.015 mol) of nitrogen dioxide gas were absorbed in 370 ml. of glacial acetic acid at room temperature. The solution was heated to 75° C. and passage of air through the solution was begun. 11.8 grams (.058 mol) of α,α'-hydrazobis(N-isopropyl)formamide in 130 ml. of glacial acetic acid was added at 75–80° C. over a ½ hour period. The solution became red-orange in color. The solution was cooled and the solvent removed under reduced pressure. A mixture of methanol and cyclohexane was added to the residue. The crystals which separated were filtered off and recrystallized from benzene. 8.7 grams, 74.5% of theory, of α,α'-azobis(N-isopropyl) formamide were obtained in the form of yellow crystals, M.P. 166–167° C. (decomp.). Assay by idometric analysis was 92%.

EXAMPLE NO. 10

*Conversion of hydrazodicarbonamide to azodicarbonamide-nonsolvent system*

Biurea powder was placed in a round bottom glass vessel slowly rotating in a horizontal plane. A gaseous air-nitrogen dioxide stream was passed into the vessel and the tumbling powder gradually became yellow-orange in color. There was a tendency for the powder to adhere to the walls instead of tumbling and where this occurred, the sub-surface layer remained white. The powder was removed from the vessel, homogenized and assayed. The azodicarbonamide content as measured by iodometric titration was 25.5%. The weight yield was practically quantitative.

EXAMPLE NO. 11

*Conversion of hydrazodicarbonamide to azodicarbonamide-water solvent system*

50 grams of biurea in a slurry with 75 ml. of water were placed in a round bottom flask and the flask was rotated at 10 r.p.m. to form a thin film over the inner surface of the flask. A gaseous air-nitrogen dioxide stream was passed into the open flask into contact with the slurry therein for 1 hour. The solids were then filtered off, dried and assayed. The yield was 28.7% of theory of azodicarbonamide of 84.8% assay by iodometric titration.

As will be apparent to those skilled in the art in the light of the foregoing disclosure, many modifications, alterations and substitutions are possible in the practice of this invention without departing from the spirit or scope thereof.

We claim:
1. A method of oxidizing an aliphatic hydrazo compound to the corresponding aliphatic azo compound which comprises contacting said hydrazo compound at a temperature in the range 0–150° C. with a gaseous mixture containing elemental oxygen and nitrogen dioxide to effect oxidation of the hydrazo compound to said corresponding azo compound, said elemental oxygen being supplied in at least a stoichiometric amount relative to the amount of said hydrazo compound to be oxidized.
2. A method in accordance with claim 1 wherein said hydrazo compound is hydrazodicarbonamide and wherein said corresponding azo compound is azodicarbonamide.
3. A method in accordance with claim 1 wherein said hydrazo compound is diethylhydrazodicarboxylate and wherein said corresponding azo compound is azodiformic acid diethyl ester.
4. A method in accordance with claim 1 wherein said hydrazo compound is α,α'-hydrazodi-iso-butyronitrile and wherein said corresponding azo compound is α,α'-azodi-iso-butyronitrile.
5. A method in accordance with claim 1 wherein said hydrazo compound is hydrazodicarbonamidine and wherein said corresponding azo compound is 1,1'-azodicarbonamidine.
6. A method in accordance with claim 1 wherein said hydrazo compound is α,α'-hydrazobis(N-isopropyl)formamide and wherein said corresponding azo compound is α,α'-azobis(N-isopropyl)formamide.
7. A method in accordance with claim 1 wherein said hydrazo compound is suspended as a slurry in a liquid carrier and wherein contact between said hydrazo compound and said gaseous mixture containing elemental oxygen and nitrogen dioxide is effected by introducing into said liquid carrier gaseous elemental oxygen and gaseous nitrogen dioxide.
8. A method in accordance with claim 1 wherein the contacting operation is carried out under substantially anhydrous conditions.
9. A method in accordance with claim 1 wherein the contacting operation is carried out in the presence of a solvent for said hydrazo compound.
10. A method in accordance with claim 2 wherein said solvent comprises an aliphatic organic acid in liquid state.
11. A method in accordance with claim 2 wherein said solvent comprises an aqueous mineral acid.
12. A method in accordance with claim 2 wherein said solvent is glacial acetic acid.
13. A method in accordance with claim 2 wherein said solvent is water.
14. A method in accordance with claim 2 wherein said solvent is chloroform.

References Cited by the Examiner

UNITED STATES PATENTS

| | | | |
|---|---|---|---|
| 1,958,371 | 5/34 | Schmelkes | 260—192 |
| 2,469,358 | 5/49 | Alderson et al. | |
| 2,744,105 | 5/56 | Barney | 260—192 |
| 2,788,367 | 4/57 | Bills et al. | 260—524 |
| 2,839,575 | 6/58 | Fetterly | 260—524 |
| 2,988,545 | 6/61 | Hill | 260—192 |
| 3,017,406 | 1/62 | Mehr | 260—192 |

FOREIGN PATENTS

| | | |
|---|---|---|
| 1,005,079 | 3/57 | Germany. |
| 1,102,169 | 3/61 | Germany. |

OTHER REFERENCES

Lenhar, S.: Jour. Am. Chem. Soc., vol. 53 (1931), pp. 2962–2967.

CHARLES B. PARKER, *Primary Examiner.*